United States Patent [19]

King, Jr. et al.

[11] Patent Number: 5,023,402

[45] Date of Patent: Jun. 11, 1991

[54] WATERPROOF WIRE CONNECTOR

[75] Inventors: Lloyd H. King, Jr., Town & Country; Thomas A. King, Chesterfield, both of Mo.

[73] Assignee: King Technology of Missouri, Inc., St. Louis, Mo.

[21] Appl. No.: 478,687

[22] Filed: Feb. 12, 1990

Related U.S. Application Data

[63] Continuation-in-part of Ser. No. 450,156, Dec. 13, 1989, abandoned.

[51] Int. Cl.$^5$ .............................................. H02G 15/08
[52] U.S. Cl. ........................................ 174/87; 29/872; 439/447; 439/449; 439/456
[58] Field of Search ................... 174/87; 29/868, 872; 439/447, 449, 452, 456

[56] References Cited

U.S. PATENT DOCUMENTS

| | | | |
|---|---|---|---|
| 1,297,614 | 3/1919 | Van Viersen | 174/87 |
| 2,416,943 | 3/1947 | Nicolazzo | 174/87 |
| 3,083,260 | 3/1963 | Bird | 174/87 |
| 3,497,607 | 2/1970 | Swanson | 174/87 |
| 3,597,528 | 8/1971 | Penfield | 174/87 |
| 3,934,076 | 1/1976 | Smith | 174/87 |
| 3,937,870 | 2/1976 | Bumpstead et al. | 174/87 |
| 4,039,742 | 8/1977 | Smith | 174/87 |
| 4,053,704 | 10/1977 | Smith | 174/87 |
| 4,107,453 | 8/1978 | Erixon | 174/87 |
| 4,295,004 | 10/1981 | Dauser, Jr. | 174/87 |
| 4,314,094 | 2/1982 | Smith | 174/87 X |
| 4,446,332 | 5/1984 | Dauser, Jr. | 174/87 |
| 4,751,350 | 6/1988 | Eaton | 174/87 |

Primary Examiner—Morris H. Nimmo
Attorney, Agent, or Firm—Jacobson and Johnson

[57] ABSTRACT

A waterproof connector having a rotatably wire connector with a housing attached thereto with the wire connector and the housing filed with a sealant to permit the user to simultaneously compress the junctions ends of electrical wires into low resistance electrical contact while forming a waterproof covering surrounding the twisted junction end of the wires. The process includes inserting the junction ends of electrical leads into a rotatable wire connector connected to a sleeve, which is filled with a waterproof sealant, and then rotating the wire connector while preventing the sleeve and the electrical leads from rotating.

10 Claims, 3 Drawing Sheets

WATERPROOF WIRE CONNECTOR

CROSS REFERENCE TO RELATED APPLICATIONS

This application is a continuation in part of patent application Ser. No. 07/450,156 filed Dec. 13, 1989, now abandoned, titled Waterproof Wire Connectors.

FIELD OF THE INVENTION

This invention relates generally to waterproof connectors and, more specifically, to waterproof wire connectors that can in one operation permit the user to simultaneously compress the junction ends of electrical wires into low resistance electrical contact while forming a waterproof covering around the junction ends of the electrical wires.

1. Background of the Invention

The concept of wire connectors for connecting the junction of two wires together by twisting a cap on the wires is old in the art. Such twist on connectors are commonly called "wire connector". Typically, to use a wire nut the user inserts the twisted ends of electrical wires into a stepped cavity on the inside of the wire connector. The user then holds the wire in one hand and with the other hand twists the wire connector. The twisting action pulls the junction ends of the wires into a low resistance electrical contact. If the connector is located in a wet location it is necessary to place a waterproof sealant over the connector. In order to prevent water or moisture from entering the connector and forming an oxidation layer over the ends of the wire the user inserts the wire connector and the wire into some type of a waterproof potting compound. The compound may be either a non hardening or a hardening compound. In either case the compound creates a waterproof capsule over the wire connector and the junction ends of the electrical wires.

The prior art process is time consuming because it involves two separate steps as well as the nuisance of having separate potting compounds and containers to hold the potting compound. The present invention provides an improved wire connector that permits the user in one continuous action to simultaneously form the junction ends of wire leads into a low resistance electrical connection that is surrounded by a waterproof sealant to form a waterproof covering around the junction ends of the wire leads.

2. Description of the Prior Art

The Viersen U.S. Pat. No. 1,297,614 shows a process where twisted wire ends are potted in a solder.

The Nicolazzo U.S. Pat. No. 2,416,943 shows a wire connector that squeezes the ends of the wires between an outer housing and an inner housing.

The Bird U.S. Pat. No. 3,083,260 shows a cup shaped body that has a metal cement or putty located around the twisted ends of two electrical leads.

The Swanson U.S. Pat. No. 3,497,607 shows a wire connector that has a spring in the cavity of the connector that cuts through the insulation on the wires.

The Smith U.S. Pat. No. 4,039,742 shows a waterproof splice that uses an enclosed tube containing a sealant that covers the electrical connection between the wires.

The Erixon U.S. Pat. No. 4,107,453 shows a wire connector with an inner and an outer housing with the ends of the wires located between the inner and the outer housing. Twisting the outer housing while holding the inner housing twists the wires into electrical contact.

The Dauser U.S. Pat. Nos. 4,295,004 and 4,446,332 show a solderless wire connector where a cap is squeezed over the ends of the wires to provide an electrical connection.

The Eaton U.S. Pat. No. 4,751,350 shows a cap containing a sealant and retentions to engage the end of a wire inserted into the cap to provide a sealing device around the end of the wire.

SUMMARY OF THE INVENTION

Briefly, the present invention comprises an improvement to a wire connector by providing a wire nut with a sleeve rotatably mounted on the end of the wire connector with the sleeve containing a waterproof sealant to permit a user to insert the twisted junction ends of electrical leads into the wire connectors by inserting the junction ends into the waterproof sealant located in the sleeve and the wire connector. The user then holds the wire and sleeve and rotates the wire connector to simultaneously form the junction ends of the electrical leads into a low resistance electrical connection protected by the waterproof sealant.

DESCRIPTION OF THE PREFERRED EMBODIMENT

Figure 1:
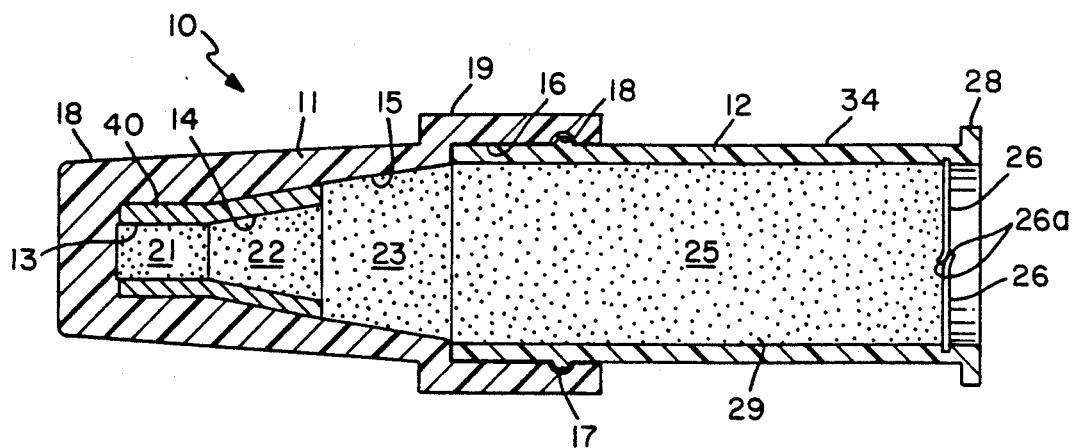
FIG. 1 shows a cross sectional view of our waterproof wire connector.

Referring to FIG. 1 reference numeral 10 generally identifies our waterproof wire connector for simultaneously forming a waterproof low resistance electrical connection between the junction ends of electrical leads. Waterproof wire connector 10 includes a cylindrical electrical insulated housing 11 having a cylindrical opening 16 for rotatively engaging a cylindrical tube or sleeve 12. Located on the closed end of housing 11 is an electrical conducting collar 40 having a first cylindrical interior surface 13 and a converging spiral surface 14. Collar 40 is rigidly mounted in housing 11 so that one can twist housing 11 and collar 40 about the twisted ends of electrical leads to provide a low resistance electrical connection therebetween. Housing 11 is virtually identical to existing wire connector except for a cylindrical surface 16 to rotatively support a sleeve 12 and an annular opening 18 located in the cylindrical surface 16 to prevent axial displacement of sleeve 12 in housing 18. While our connector is shown with an electrical conducting collar 40 having a wire coil forming a spiral surface in some applications the wire coil is replaced with a nonconducting collar having a surface for twisting on electrical leads.

Rotatively connected to the open end of housing 11 is cylindrical tube or sleeve 12. The cylindrical tube 12 has an exterior cylindrical surface 34 with a cylindrical retaining bead and or ring 17 extending radially outward from tube 12. Located on the interior cylindrical surface 16 of housing 12 is a cylindrical recess 18 that extends completely around surface 16. The bead 17 engages cylindrical recess 16 to prevent axial withdrawal of tube 12 from housing 11 but permits rotational movement of housing 11 with respect to sleeve 12. The cylindrical surface 34 engages a portion of cylindrical recess 16 in a close mating relationship that provides a tortuous path for escape of sealant. That is, the annular path between the two surfaces and the combination of a bead 17 and annular recess 18 effectively prevent the sealant from leaking out of my connector during storage and handling.

Waterproof connector 10 includes interior compartments 21, 22, 23, and 25 that are partially filled with a viscous sealant 29. Typically sealant 29 can be a silicone base material or the like, a potting compound, greases, or any other waterproofing compounds. A viscous sealant that remains in the connector due to its inherent nonflowability is preferred since the sealant will not run out when our waterproof wire connectors are stored for use or during use. However, other materials could also be used, for example potting compounds that set after exposure to the air. Typical of materials for use with our invention are greases, potting compounds, or any other waterproofing compound.

Located on the end of tube 12 is a flexure cover that comprises a plurality of pie shaped resilient segments 26 that converge toward the pointed end 26a of the segments. (FIG. 5) The segments slightly overlap each other to form a closure to hold sealant 29 within connector 10 during the handling and transporation of our waterproof connectors. That is prior to use the waterproof connectors are loosely stored in a box. With the end of the tube covered by the overlapping segments it prevents one from accidently getting the sealant onto other connectors. If one uses a waterproof sealant that sets when exposed to the air one could use a continous foil instead of segments 26. With a foil one would pierce the foil with the end of the wires as the wire ends are inserted into the tube.

Figure 5:
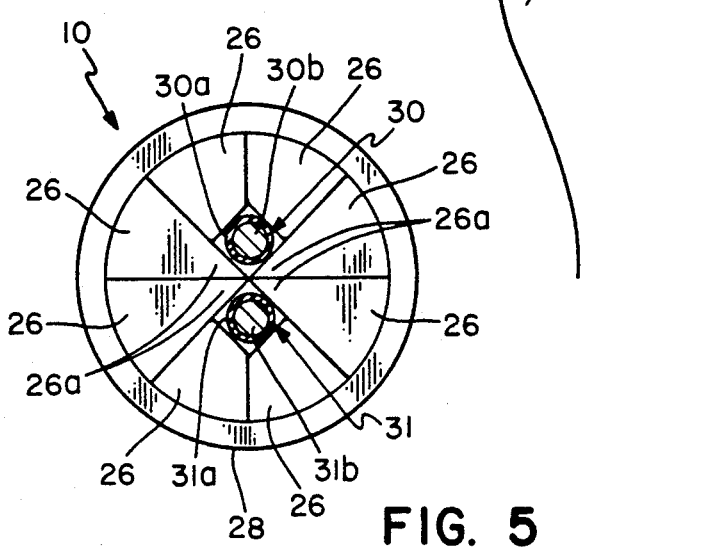
FIG. 5 is an end view of our waterproof connector taken along lines 5—5 of FIG. 4.

FIG. 5 shows how the segment ends 26a flex inward to permit the wires 30 and 31 to be inserted into our waterproof connector. Thus the segments permit a wire to be inserted therethrough while at the same time flexing into a position to close off and seal around the wires.

When one inserts a twisted wire pair into the cylindrical tube the resilient segments 26 flex inward around the wire to permit the wire to be inserted into the cylindrical cavity 21 while also providing a self forming opening that automatically conforms to the size and shape of the electrical wires. As FIG. 3 illustrates the sealant 29 expands to fill the cavity as the wires are inserted into the connector and displace the sealant 29.

Figure 2:
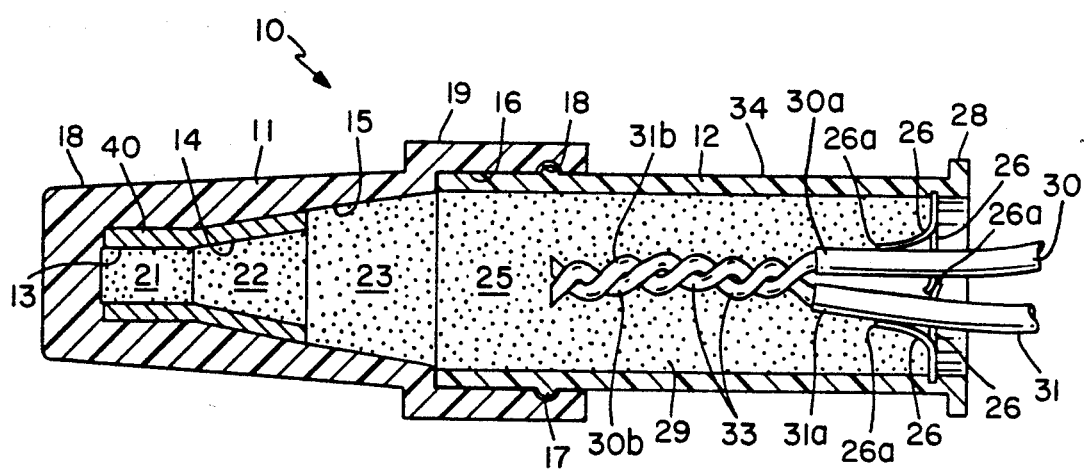
FIG. 2 shows a cross sectional view of our waterproof connector with the junction ends of two wire leads partially inserted into our connector.
Figure 3:
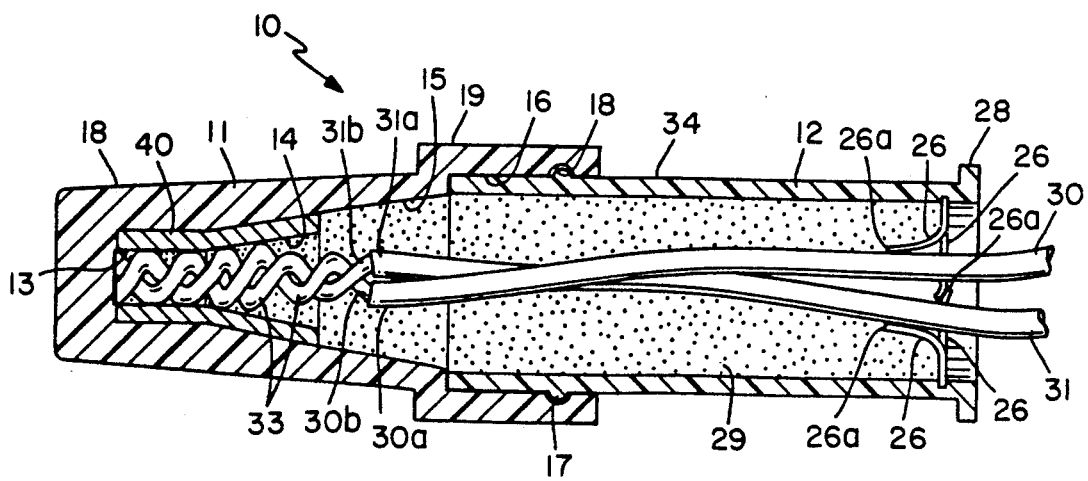
FIG. 3 shows a cross sectional view of our waterproof connector with the junction ends of two wire leads twisted into the cavity in the connector.
Figure 4:
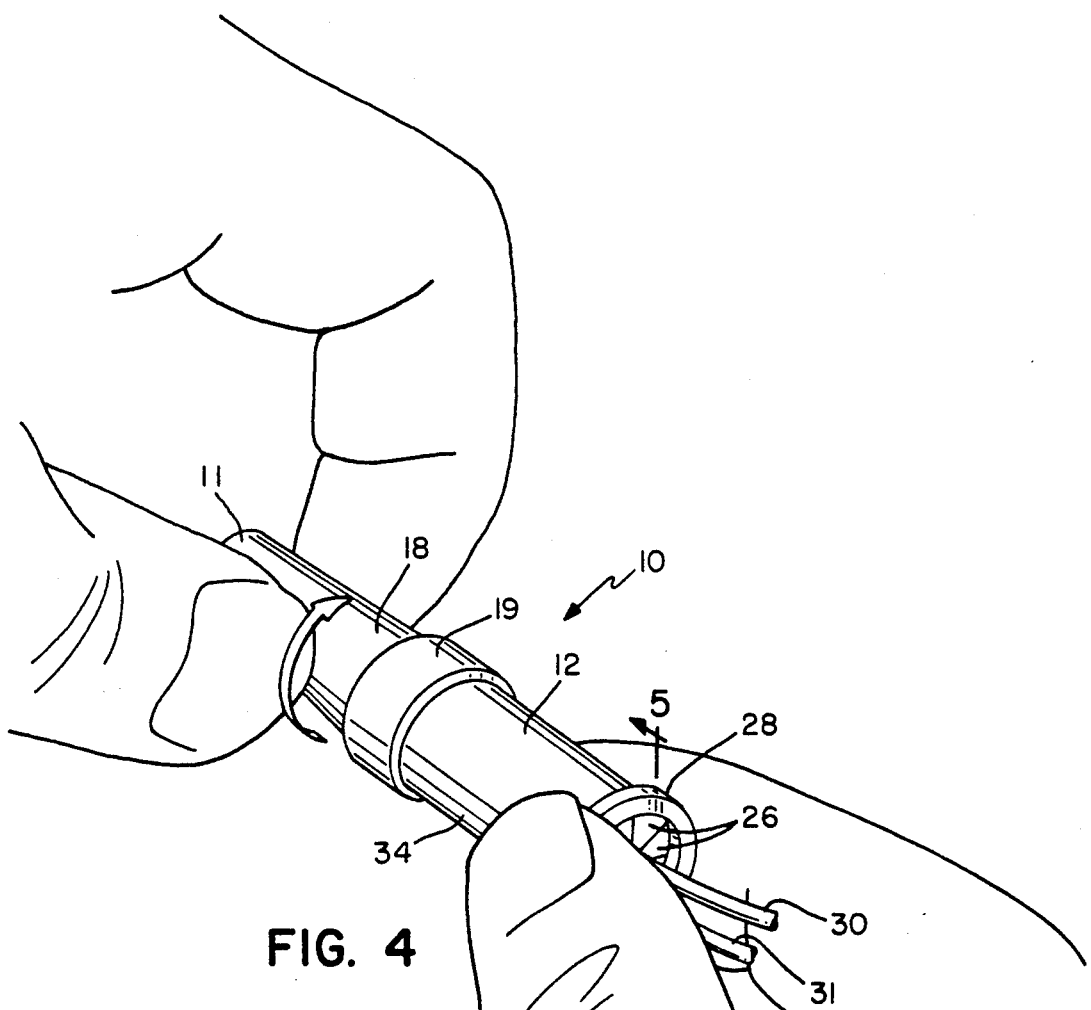
FIG. 4 shows a user rotating one end of our waterproof wire connector while holding the other end stationary.

In order to understand the operation of our invention reference should be made to FIG. 2, FIG. 3 and FIG. 4. FIG. 2 shows an installer inserting a twisted junction 33 formed from wires 30 and 31 into the sealant filled cavity 25. Wire 30 has an electrical insulating covering 30a surrounding a metal wire 30b. Similarly, wire 31 has an electrical insulating covering 31a surrounding metal wire 31b. FIG. 3 shows the wire junction inserted into the cavity 21 with the twisted wire junction 33 contacting the inside surface 13 of collar 40.

FIG. 4 illustrates how a user can simultaneously form a waterproof low resistance electrical connection between the electrical leads with our waterproof connector. To simultaneously form the electrical connection and the waterproof covering the operator grasps wires 30 and 31 and the outside surface 34 of tube 12 in one hand and axially inserts the twisted ends of wires 30 and 31 into the chambers 21 and 22 of housing 11. Once the junction ends of the wires are inserted into chambers 21 and 22 the installer takes the other hand and grasps exterior surface 19 on housing 11. The installer then rotates housing 11 while holding the wires and the sleeve to firmly twist the wire junction 33 into contact with the metal collar 40. At the same time the viscous sealant 29 located in the interior cavities 21, 22, 23, and 25 forms a waterproof protective covering over junction end 33 of wires. The use of the sealant in conjunction with a twist on connector permits the installer to simultaneously connect and seal the junction in housing 11 to prevent water and moisture from entering housing 11 which could cause oxidation of the wires resulting in a poor electrical connection. Although the sealant is present in cavities 21 and 22 it has been found that the sealant does not prevent one from rotating housing 11 to twist the junction ends of electrical leads into a low resistance electrical connection.

In the preferred embodiment we show sleeve 12 rotatively connected to wire connector 11. In certain embodiments one could fixedly connect sleeve 12 to wire connector 11. For example if the sealant was flowable it would flow around the wires as the sleeve is rotated about the wires. If the sealant is flowable one could use a flowable air hardened material such as an epoxy to form the waterproof covering over the twisted ends in the wire connector. In order to maintain the sealant within the rigid connector one can use segments with a spiral configuration that will flex around the wire as the wire is rotated. Another variation of my invention is to have the end seal rotate with respect to sleeve. For example, flexure segments 26 could have an annular base region that is rotatably mounted in an annular recess in sleeve 12.

Figure 6:
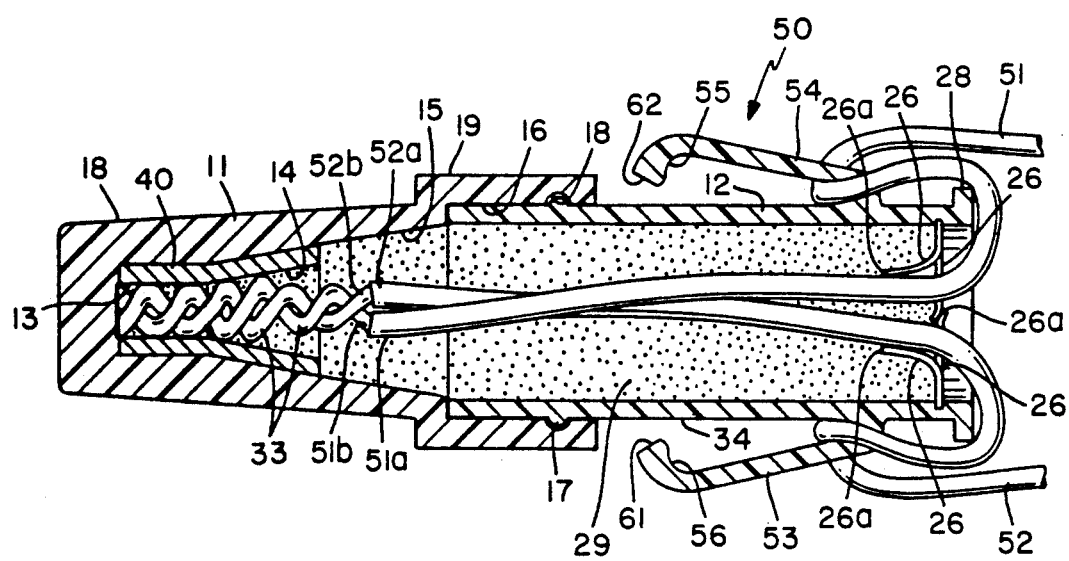
FIG. 6 shows a cross sectional view of another embodiment of our invention.

Referring to FIG. 6 an alternate embodiment of our invention is shown with reference numeral 50 identifying the invention. Connector 50 is identical to connector 10 except the connector 50 includes a first resilient wire clip 54 located on one side of housing 12 and an identical resilient wire clip 53 located on the opposite side of housing 12. Identical parts in FIG. 6 and FIGS. 1-5 and are identified with identical numbers. Resilient clip 54 compress a forward extending member that has a curved section 55 terminating in an end 62 that is slightly angled to permit sliding a wire between clip 55 and surface 34. Likewise clip 53 includes a curved surface 56 and an angled end 61.

FIG. 6 illustrates that wire 51 extends through opening in the end of sleeve 12 and around clip 54 and then back in the same direction. The purpose of clip 54 is to ensure that the wire 51 is not accidentally pulled out of wire connector 11 during handling of the wires. FIG. 6 also illustrates that wire 52 extends through opening in the end of sleeve 12 and around clip 53 and then back in the same direction. Likewise the purpose of clip 53 is to ensure that the wire 52 is not accidentally pulled out of wire connector 11 during the handling of the wires. While only two wires are shown in my invention one can use either of our inventions with either one wire or with multiple wires. Also although two clips are shown one clip is sufficient to hold two or more wires from accidentally being pulled out of housing 12.

We claim:

1. A waterproof connector to permit a user to simultaneously form a waterproof low resistance electrical connection between electrical leads comprising:
   a cylindrical housing, said cylindrical housing having a first end and a second end;
   an electrical conducting collar located in said cylindrical housing to permit a user to rotate said electrical conducting collar about the twisted ends of electrical leads to provide a low resistance electrical connection between the electrical leads;
   a cylindrical tube, said cylindrical tube having a cavity therein, said cylindrical tube having a first end and a second end with said first end of said cylindrical tube rotatively mounted on either said first or said second end of said cylindrical housing;
   a sealant located in said cylindrical tube and said cylindrical housing; and
   a flexure cover located on said second end of said cylindrical tube, said flexure cover having segments that flex inward in response to insertion of the twisted junction ends of electrical leads into said cylindrical tube so that a user can simultaneously form a waterproof, low resistance electrical connection between electrical leads by grasping and holding said cylindrical tube in one hand while rotating said cylindrical housing with another hand.

2. The waterproof connector of claim 1 wherein said collar is an electrical conducting metal.

3. The waterproof connector of claim 2 wherein said sealant comprises a viscous sealant that does not flow out of the waterproof connector under normal storage conditions with said viscous sealant substantially filling the cavity in said cylindrical housing when the wires are located in said waterproof connector to thereby provide a waterproof substance surrounding the wires located in said waterproof connector.

4. The waterproof connector of claim 3 wherein said viscous sealant comprises silicone.

5. The waterproof connector of claim 4 wherein said cylindrical housing includes an annular section with an annular recess located therein to prevent axial displacement of said housing with respect to said cylindrical tube.

6. The waterproof connector of claim 5 wherein said cylindrical tube includes a retaining bead located on said cylindrical tube for rotationally engaging said cylindrical housing.

7. The waterproof connector of claim 6 wherein said segments comprise radial inward emanating segments that overlap one another to form a closure on the end of said cylindrical tube.

8. The method of simultaneously forming a waterproof low resistance electrical connection between electrical leads comprising the steps of:
   twisting the ends of electrical leads together to form a twisted junction;
   inserting the twisted junction through a tube connected to a wire connector having a cavity containing a sealant until the twisted junction engages the interior of the wire connector and is surrounded by the sealant;
   and then twisting the wire connector while holding the tube and the electrical leads so that the twisted junction is forced into a waterproof, low resistance electrical connection with the twisted junction surrounded by the sealant.

9. The method of claim 8 including the step of inserting the twisted junction through flexible segments before inserting the twisted junction into said cylindrical tube.

10. The method of claim 9 including the step of holding the wire connector nut in one hand and the electrical leads and cylindrical tube in the other.

* * * * *